(12) United States Patent
Davis et al.

(10) Patent No.: US 8,272,735 B2
(45) Date of Patent: Sep. 25, 2012

(54) LENS DESIGN SIMPLIFICATION PROCESS

(75) Inventors: Brett A. Davis, Holland Park (AU); Ross Franklin, Jacksonville, FL (US); Michael J. Collins, Jollys Lookout (AU); Khaled A. Chehab, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 883 days.

(21) Appl. No.: 12/242,128

(22) Filed: Sep. 30, 2008

(65) Prior Publication Data
US 2010/0079725 A1    Apr. 1, 2010

(51) Int. Cl.
*G02C 7/00*    (2006.01)
(52) U.S. Cl. ............... 351/159.74; 351/159.77
(58) Field of Classification Search ............... 351/177, 351/246, 159.74, 159.77; 264/1.1, 1.32
See application file for complete search history.

(56) References Cited

U.S. PATENT DOCUMENTS

| | | | |
|---|---|---|---|
| 4,495,313 A | 1/1985 | Larsen | |
| 4,680,336 A | 7/1987 | Larsen | |
| 4,889,664 A | 12/1989 | Kindt Larsen et al. | |
| 5,039,459 A | 8/1991 | Kindt Larsen et al. | |
| 5,057,578 A | 10/1991 | Spinelli et al. | |
| 5,314,960 A | 5/1994 | Spinelli et al. | |
| 5,371,147 A | 12/1994 | Spinelli et al. | |
| 5,540,410 A | 7/1996 | Lust et al. | |
| 6,305,802 B1* | 10/2001 | Roffman et al. | 351/212 |
| 2002/0159030 A1* | 10/2002 | Frey et al. | 351/212 |
| 2005/0099600 A1* | 5/2005 | Frey et al. | 351/205 |
| 2005/0124983 A1* | 6/2005 | Frey et al. | 606/5 |
| 2007/0121064 A1* | 5/2007 | Norrby et al. | 351/177 |
| 2007/0258044 A1* | 11/2007 | Norrby et al. | 351/212 |

FOREIGN PATENT DOCUMENTS
GB     2426812 A     6/2006
WO    WO 0111418 A1   2/2001

OTHER PUBLICATIONS

PCT International Search Report for PCT US2009 058596 Date of Mailing Jan. 4, 2010.

* cited by examiner

*Primary Examiner* — James Greece

(57) ABSTRACT

A method for producing lenses with at least one simple surface that is optically equivalent to a lens having two complex surfaces.

2 Claims, 9 Drawing Sheets

LENS DESIGN SIMPLIFICATION PROCESS

BACKGROUND OF THE INVENTION

The invention involves a method of designing and making lenses with simpler surfaces based on lenses with more complex surfaces. The manufacture of contact lenses with two complex surfaces is complicated, costly, and requires extremely precise mechanical tolerances. This is particularly true in the case of non-rotationally symmetric surfaces. Simple surfaces such as spherical and toroidal forms reduce design and manufacturing difficulties. Converting complex surfaces into an optically equivalent lens design which has a single complex surface and a simple surface design would thus be beneficial.

The surface topography of most human corneas is not spherical and typically changes at varying, unpredictable and unique rates from the center of the cornea out to the periphery in a manner that is often quite complex. Lens designs made to account for these effects can involve complex geometries on both front and back surfaces. For example, a cornea with several different astigmatic aspects or higher order aberrations may compel a lens design with many irregular surfaces on both the front and back surfaces of the lens. Where these lenses are soft contact lenses this greatly complicates their manufacture. It also ironically adds a degree of unpredictability in that a complex back surface can alter the on-eye characteristics of the lens in a way that detracts from the optical effect the lens would ideally have.

This complexity is even more likely in modern lens design that seeks to integrate corneal topographic data and ocular wavefront data with primary ametropia measurements. As more of this type of information is used in lens design and manufacture the likelihood of obtaining a complex design that could produce excellent visual results but which are very difficult to manufacture increases. It is thus desirable to find simple lens designs that are optically equivalent or nearly equivalent to those complex designs.

SUMMARY OF THE INVENTION

In one aspect of the invention, a method for producing lenses includes taking a lens design having two non-rotationally symmetric complex surfaces and generating an optically equivalent simpler contact lens design. The lens design can include an optic zone on either the front or back surface which is a rotationally symmetric surface while the other surface is a complex non rotationally symmetric surface. The lens design may also include rotational stabilization.

In another aspect of the invention, the method incorporates the use of corneal topographic information such as may be obtained from a corneal topographer or videokeratoscope.

In yet another aspect of the invention the method incorporates data relating to the sum total optical aberration of the eye such as that obtained using a wavefront sensor.

In yet a further aspect of the invention, a system for designing a contact lens includes a corneal topographer for acquiring corneal topographic information of an eye of a person, a device for utilizing the corneal topographic information to define a front and back surface of the contact lens, and a device for redefining the lens so that at least one of them is simple and the refractive properties of both front and back surfaces of the originally designed lens are equivalent.

In yet a further aspect of the invention, lenses are made using the methods and systems of the invention.

In yet a further aspect of the invention, a contact lens is designed utilizing a rotationally symmetric back surface shape and a custom-manufactured front surface shape.

DETAILED DESCRIPTION

Figure 1:
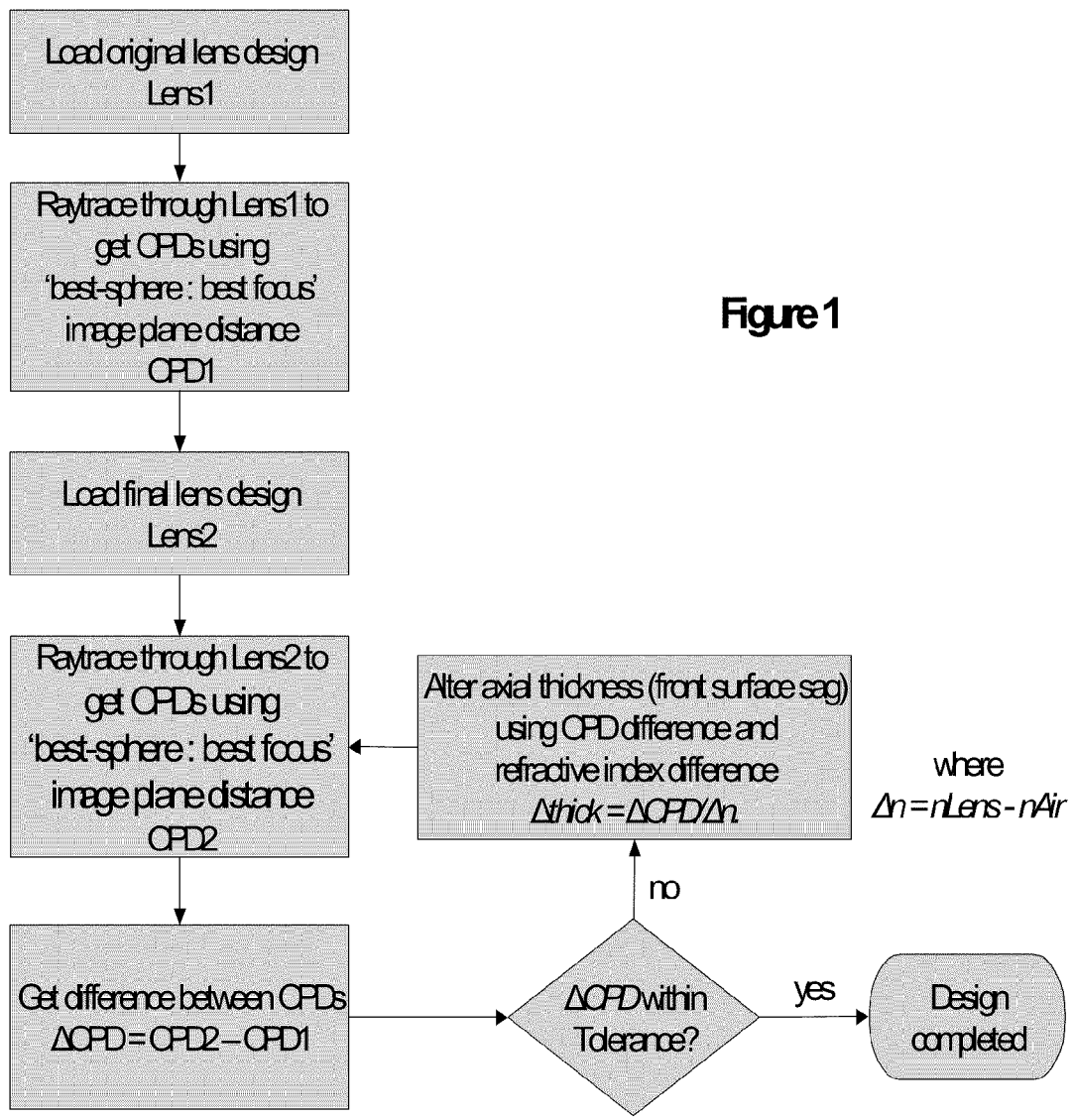
FIG. 1 is a flowchart of the method of the invention.

The invention involves transforming a lens design that includes both complex front and back surface characteristics to alter the refraction of light to correct vision to a design that includes only a complex design on either the front or back surface and a simple design on the other surface with equivalent refractive properties. Alternatively, the transformed design may include both complex front and back surface characteristics for correcting vision but with reduced complexity relative to the design from which it was transformed.

Lenses such as a contact lens that are amenable to the inventive process are those that include complex geometries. A lens with a complex design is one that is not rotationally or bilaterally symmetric such as one would use to correct high order aberrations. Simple designs are those that are rotationally or bilaterally symmetric such as spherical or torric designs. The complex designs that are of interest can be the designs that result from the application of known design techniques for refractive corrections arrived at by ocular wavefront analysis, corneal topographic analysis, in addition to basic sphere-cylindrical prescriptive analysis. In the most preferred embodiment of the invention, the complex surfaces that are redefined are non-rotationally asymmetric on both surfaces but are sphere or spherocylindrical on the back surface after the process is completed. These lenses (referred to as lens 1 in this specification) are the lenses from which new lenses having one or more simple surfaces are derived.

According to one aspect of the present invention, acquiring arbitrary corneal topographic elevational information about a subject's eye starts the process. This data is included in the design of lens 1 using ordinary design techniques. Any of a different number of methods for acquiring topographic data may be used, however, the topographic information is generally transformed to a form suitable for use in designing a customized contact lens. The original topographic data is acquired using a corneal topographer, videokeratoscope, and similar or equivalent device.

The elevational data may be transformed onto a grid pattern, which may be rectilinear, polar concentric, or of a spiral format to easily correspond to the mechanism by which the surface of a lens or lens mold may be tooled using a CNC (computer numeric control) lathe, or similar manufacturing system. Examples of such systems include direct machining of a polymer button, milling, laser ablation/machining, injection mold insert, or a deformable mold apparatus.

Initially, the elevational data is applied to the soft contact lens model in an unflexed state. Also, the elevational data may be used to indicate minor variations in the back surface only, the front surface only, or a combination of the front and back surfaces, with respect to the mean corneal surface. Next, the data is transformed by taking into account the soft lens flexure (wrap) when the lens is placed on the eye. Typically, the back surface curvature of soft lenses are flatter, for example, by 1 to 1.5 mm, than the front surface curvature of the cornea that they are placed on. Thus, the effects of both elevation of the individual cornea and wrap are taken into account when utilizing the original topographic data in designing a soft contact lens surface or mold insert.

The flexure transformed elevation data may then be mapped onto the CNC grid pattern and utilized to make a soft contact lens or mold tool surface. The advantage of utilizing the transformed data is the ability to produce a lens, or mold insert, which exhibits fluctuations in thickness on the grid pattern that may or may not be rotationally symmetric about the center of the lens.

If the manufactured soft lens properly wraps to the underlying cornea, the fluctuations in surface elevation (above and below the mean spherical surface of the cornea) will be significantly neutralized. In this way, corneal aberrations and irregularities will be neutralized, and as a result, the optical aberrations due to irregular corneal topography will be eliminated.

Although knowing the overall corneal topography of the eye yields a great deal of information regarding the optimal fitting of a soft contact lens and the ocular aberrations due to the irregular corneal topography, it does not provide sufficient data for optimally correcting the total ocular aberrations of the eye. In particular, asphericity, gradient index structure of, and decentration (misalignment) of the crystalline lens, are beyond the capability of topographic measurement.

Ocular optical wavefront measurement may be carried out using, for example, the output of a crossed cylinder aberroscope, a device that measures ocular Modulation Transfer Function (MTF) via point spread or line spread, a Shack-Hartmann grid device, or any similar device which measures, estimates, interpolates or calculates the ocular optical wavefront.

The ocular optical wavefront information concerns the optical components of the eye, including the cornea, crystalline lens, system length, tilts, decentrations of the elements of the eye, asymmetrical irregularities, and asphericities. The optical wavefront measurements are also is included in the design of lens 1 using ordinary design techniques. Although knowing the wavefront aberrations of the total eye yields a great deal of information, it nevertheless, does not provide any data which may be used to optimally fit a contact lens.

The required changes in lens surface elevation or slope to achieve correction of the total ocular wavefront aberration may be implemented on the back surface only, the front surface only, or some combination of both the front and back surfaces. The required surface elevation or slope changes will take into account the elevation changes required to fit and correct the irregularities in the corneal topography. Because the soft lens wraps to the underlying shape of the cornea, the combined elevation changes determined by the corneal topography and ocular wavefront aberration may be applied to the back surface only, the front surface only, or some combination of both front and back surfaces.

The present invention also utilizes conventional sphere-cylindrical prescriptive information. This information includes the distance sphere, distance astigmatic cylinder power and axis, and the near add power, if required. In one embodiment of the present invention, this information is determined using conventional subjective refraction techniques. Alternatively, the sphere, cylinder and axis are determined based on an analysis of the wavefront. This may be accomplished, for example, by reducing the Shack Hartmann wavefront data to Zernike coefficient terms, and using the relevant terms to derive the sphere, cylinder and axis information. These Zernike terms may then be reduced to elevational data and applied to a lens surface.

Referring to FIG. 1, one embodiment of the method according to the present invention is illustrated. In this preferred embodiment, a corneal topographer is used to generate topographic data that is then used to define the contact lens back surface. The contact lens back surface is shaped to complement the corneal surface over which it is to be placed. In this way, the contact lens back surface and the corneal surface cooperate similar to a "hand in glove" when the lens is on the eye. This topographically defined fit also cancels out most of the corneal optical aberrations. Also in this embodiment, a wavefront sensor is used to measure the sum total optical aberration of the eye. The optical aberrations due to the cornea that are neutralized by the back surface of the lens are subtracted out of the sum total optical aberration to yield a net residual optical aberration. The net residual optical aberration is compensated for by an appropriate design of the front surface of the contact lens. The contact lens front surface is also designed to compensate for the first order conventional prescriptive components, including sphere, cylinder, axis and prism. This process defines the lens 1 design.

Once lens 1 design is achieved the Optical Path Difference (or equivalent measurement such as wavefront) is obtained (referred to as OPD1 in this specification). This is best achieved by raytracing from a predetermined reference sphere. Commercially available computer software programs such as Zemax (Zemax Development Corporation, Bellevue, Wash.) and CodeV (Optical Research Associates, Pasadena, Calif.) programs are useful for this purpose but one skilled in the art can also use manual raytracing employing the well known laws of refraction and lenses to obtain these values.

A nominal lens design (referred to as lens 2 in this specification) is selected having a simple surface that is preferably a rotationally symmetric surface. To this lens, modifications are made to at least one surface using OPD1 to derive the proper optics. Additionally, the nominal lens is chosen to have a convenient central or axial thickness. Lens 2 will have an OPD starting value of its own (referred to in this specification as OPD2). Upon raytracing lens 2, an iterative process is conducted in which the difference between the OPD1 and OPD2 is calculated to determine whether this difference is within the tolerance necessary to make the appropriate correction to the optical properties of the light entering lens 2. The axial thickness of lens 2 is adjusted so that the surface of lens 2 that does not necessarily remain simple is changed in elevational charasterics to achieve OPD1 for the overall lens. This process is repeated until the OPD difference (OPD2–OPD1) approaches zero or, in any event, is less than a twentieth of a wave. This process results in a reshaping lens 2 so that in each succeeding iteration the optics are brought closer to lens 1 while retaining at least one simple surface.

Figure 4:
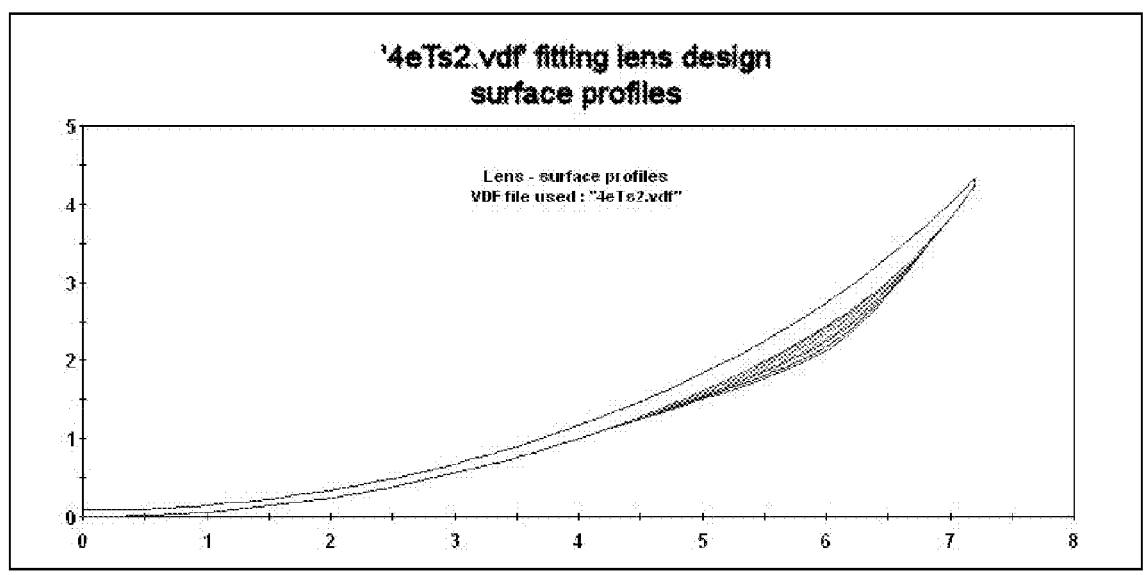
FIG. 4 is a schematic of final lens single complex surface profile design and a simple surface.

FIG. 4 shows the lens surface profile in which a predefined contact lens design was used which has the desired final rotationally-symmetric surface (the simple surface in this case). It also included the use of another nominal surface where the surfaces are separated by the desired contact lens central thickness. The optical surfaces can both be symmetric at this stage, since the OPDs are calculated and accounted for in the correction stages below.

Figure 2:
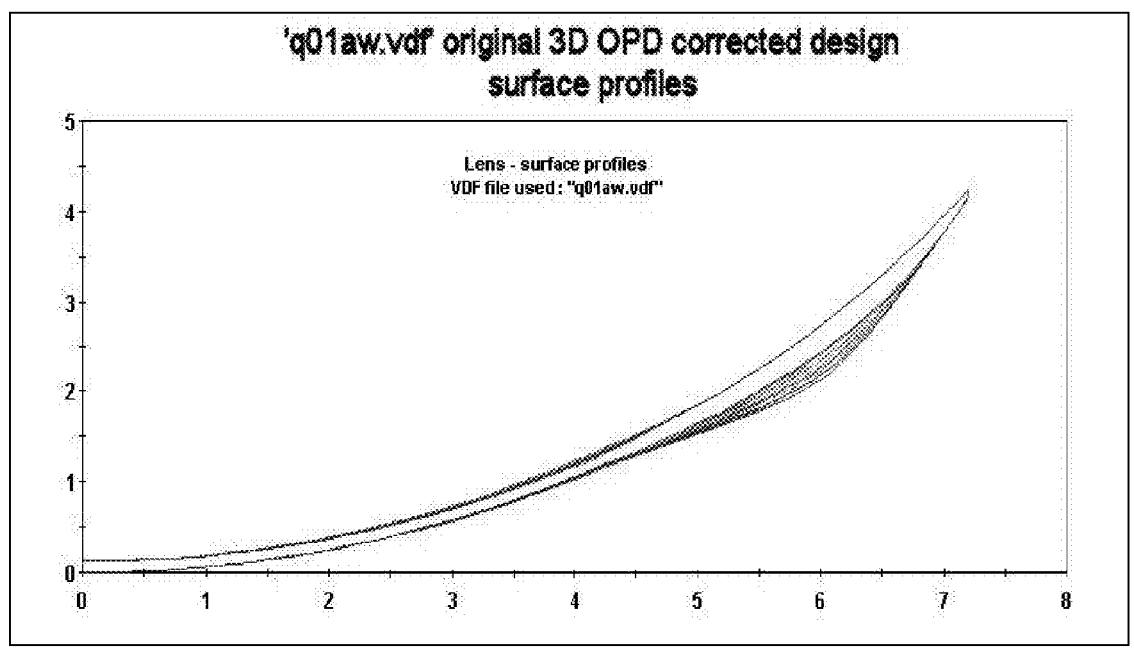
FIG. 2 is a schematic of the lens surface profiles of the original two complex surfaces.

FIG. 2 compares a the lens design that is made up of complex front and back surfaces transformed into a design in which at least one of the lens surface is a simple surface. In this example both front and back surface optic zones are non-rotationally symmetric. Multiple meridians are shown overlaid, and the sag departures are visible on both the front (bottom, convex) and back (top, concave) portions of the figure. The asymmetry is greater on outer portion of the front surface since this is the part of the lens used for rotational stabilization. Thus it is harder to see the asymmetry on the concave surface of the lens.

Figure 3:
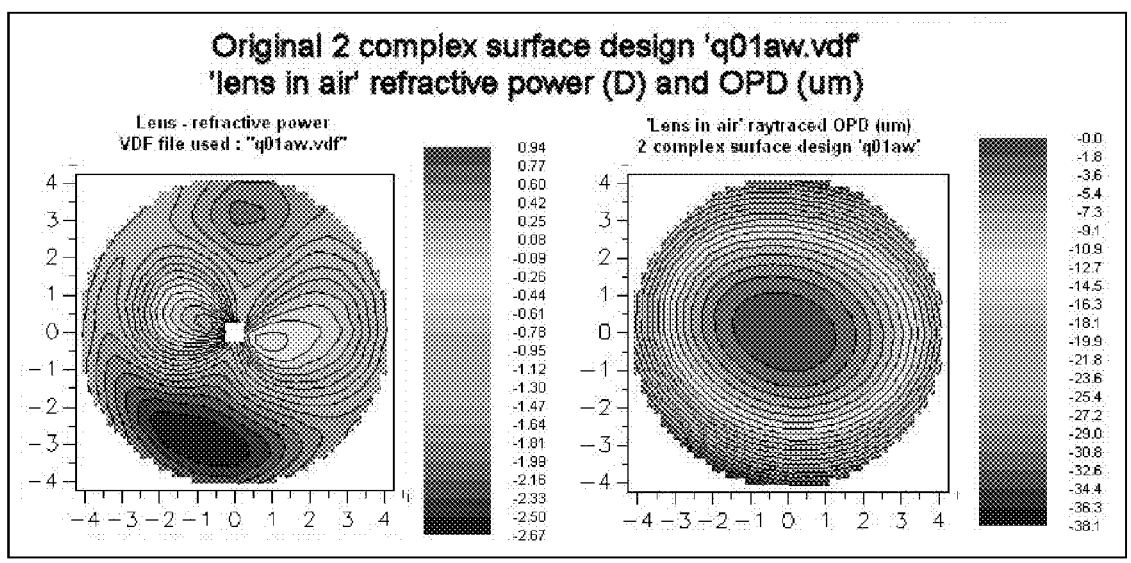
FIG. 3 is a graphical illustration that shows the lens refractive power in air and OPD maps for exemplary two non-rotationally symmetric complex surface designs.

FIG. 3 shows the result of the process of performing a 3D raytrace through the contact lens of Lens Design 1 and expressing the result as optical path difference (OPD1). This results in an illustration in 'Lens in air' format with a depiction of refractive power and OPD (optical path difference) maps shown here for the original two non-rotationally symmetric complex surface designs referred to above. The refractive power data shown on the left makes it easier to visualize optical variations compared to the equivalent OPD data used in the algorithm, shown on the right.

Figure 5:
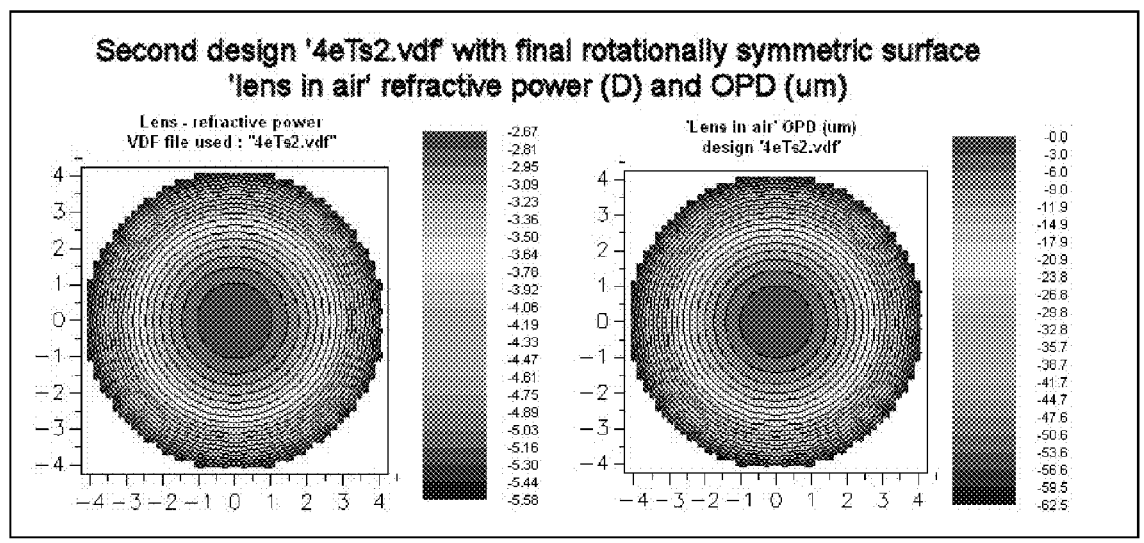
FIG. 5 shows the lens refractive power in air and OPD maps for the rotationally symmetric surface design of an exemplary lens.
Figure 6:
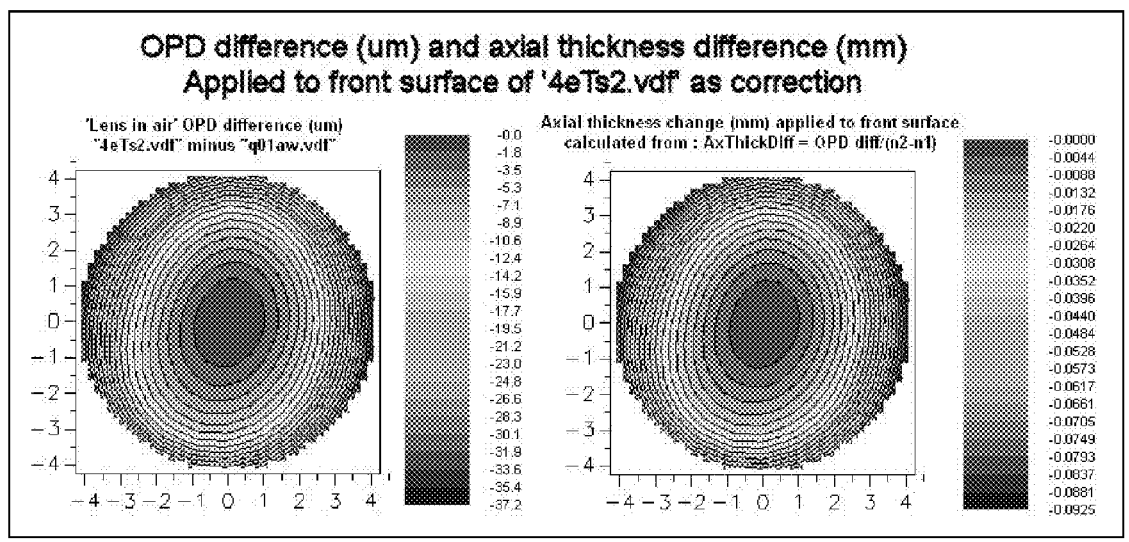
FIG. 6 shows OPD difference and axial thickness used to alter the front surface from rotationally symmetric to asymmetric in an exemplary lens.

FIG. 5 is a graphical depiction of the result of an optical raytrace using the predetermined lens design used in FIG. 4 prior to altering the nominal lens surface. The optical path difference is expressed graphically as OPD2 data for the "lens in air". The lens at this stage is rotationally symmetric but will contain all of the visual/aberrational corrections when the iterative process is completed. FIG. 6 graphically illustrates the results of the modification of the lens surface based on the use of the difference between OPD1 and OPD2 to calculate axial thickness adjustments as described above.

Figure 7:
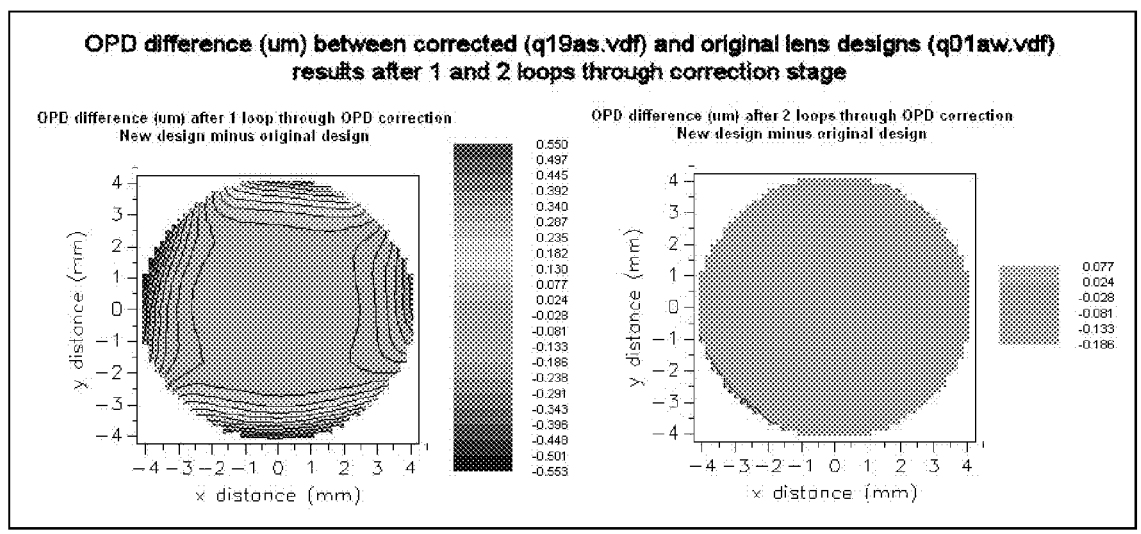
FIG. 7 shows OPD difference maps after one iteration of the iterative step of the process.
Figure 8:
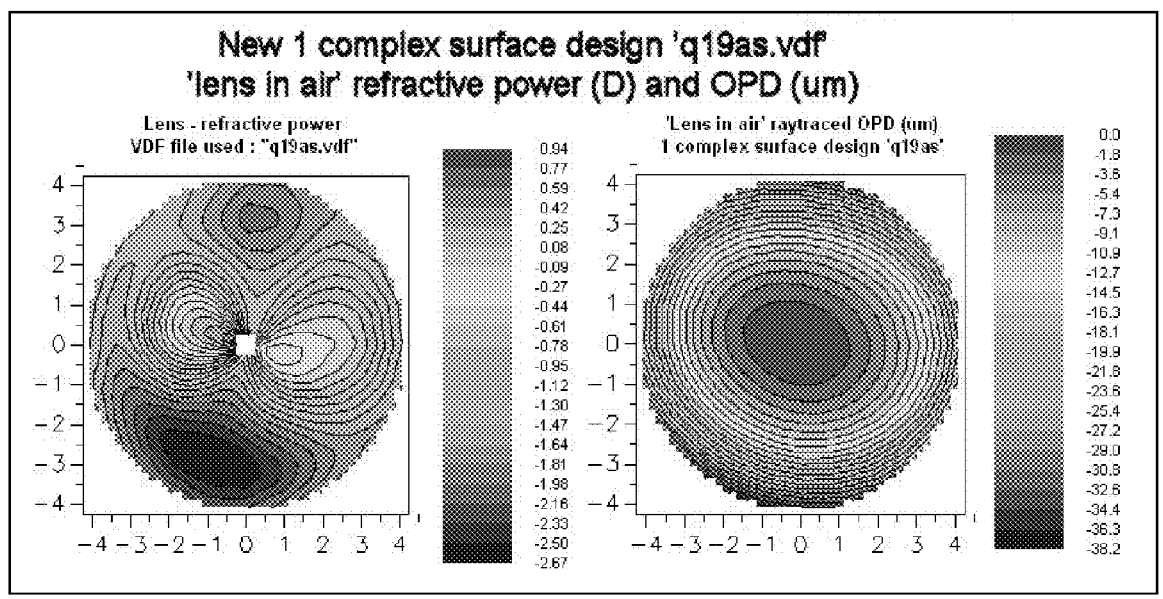
FIG. 8 shows lens refractive power in air and OPD for the final single complex surface design after the second iteration for an exemplary lens.
Figure 9:
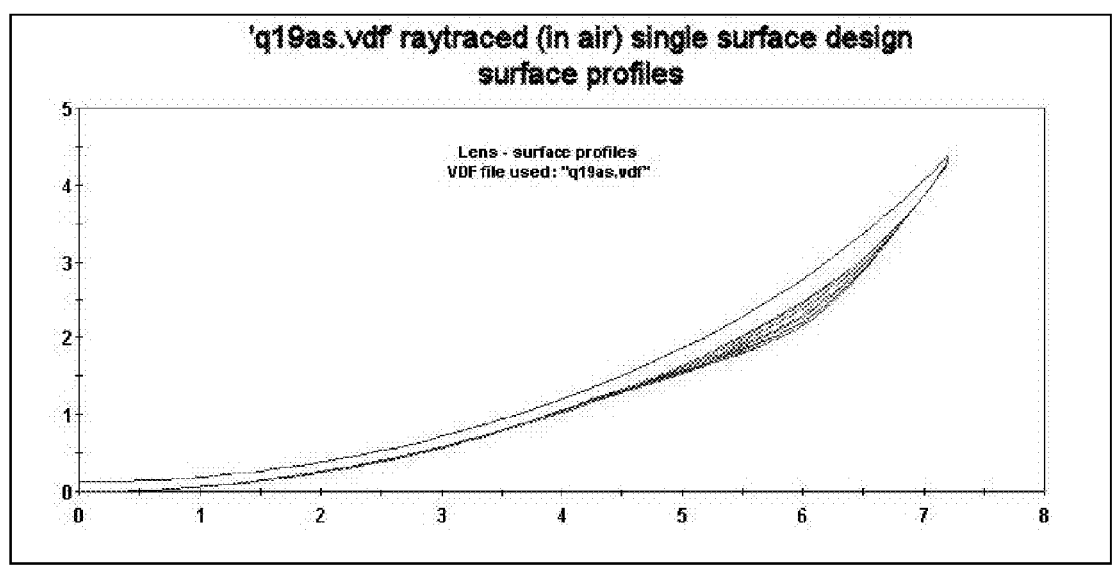
FIG. 9 is a schematic of the lens surface profiles of the final single complex surface design.

FIGS. 7 and 8 graphically illustrate lens geometry as the iterative steps of the process are conducted until the difference between OPD1 and OPD2 data approaches zero. In FIG. 7, the OPD difference between the corrected single non-rotationally symmetric surface design (corrected second lens) and the original 2 non-rotationally symmetric surface design (first lens) is shown for 1 and 2 loops through the iterative correction steps. In FIG. 8, the 'Lens in air' refractive power and OPD maps for lens 2 is shown after 2 iterations of the iterative correction steps. Comparing the 'lens in air' refractive power and OPD maps for lens 1 (FIG. 2) it can be seen that these are virtually identical and the optical design has been transferred to lens 2. FIG. 9 shows the final contact lens design for lens 2 with the rotationally symmetric back surface and non-rotationally symmetric front surface. In this case the front surface was altered to give the desired correction.

The preferred embodiment is to convert from two complex surfaces to a complex front surface plus a simple back surface. Using this process can result in engineered front and back surfaces designed to refract light in a manner that corrects vision and a lens that is easy to manufacture.

The lenses of the invention may be made from any suitable lens forming material for manufacturing hard or soft contact lenses. Illustrative materials for formation of soft contact lenses include, without limitation, silicone elastomers, silicone-containing macromers including, without limitation, those disclosed in U.S. Pat. Nos. 5,371,147, 5,314,960, and 5,057,578 incorporated in their entireties by reference, hydrogels, silicone-containing hydrogels, and the like and combinations thereof. More preferably, the surface is a siloxane, or contains a siloxane functionality including, without limitation, polydimethyl siloxane macromers, methacryloxypropyl siloxanes, and mixtures thereof, silicone hydrogel or a hydrogel. Illustrative materials include, without limitation, acquafilcon, etafilcon, genfilcon, lenefilcon, senefilcon, balafilcon, lotrafilcon, or galyfilcon.

Curing of the lens material may be carried out by any convenient method. For example, the material may be deposited within a mold and cured by thermal, irradiation, chemical, electromagnetic radiation curing and the like and combinations thereof. Preferably, molding is carried out using ultraviolet light or using the full spectrum of visible light. More specifically, the precise conditions suitable for curing the lens material will depend on the material selected and the lens to be formed. Suitable processes are disclosed in U.S. Pat. Nos. 4,495,313, 4,680,336, 4,889,664, 5,039,459, and 5,540,410 incorporated herein in their entireties by reference.

The contact lenses of the invention may be formed by any convenient method. One such method uses a lathe to produce mold inserts. The mold inserts in turn are used to form molds. Subsequently, a suitable lens material is placed between the molds followed by compression and curing of the resin to form the lenses of the invention. One ordinarily skilled in the art will recognize that any other number of known methods may be used to produce the lenses of the invention.

Having described various preferred embodiments of the present invention, those of skilled in the art will understand that the described arrangements are merely illustrative of the principles of the present invention, and the other arrangements and variations may be device without departing from the spirit and scope of the invention as claimed below.

We claim:

1. A method for fabricating a contact lens, the method comprising the steps of:
   a) acquiring topographic data of a cornea of an eye to define a first contact lens back surface based on corneal aberration information;
   b) measuring the total optical aberration of the eye;
   c) calculating a net residual optical aberration by subtracting the corneal aberration information from the total optical aberration of the eye;
   d) designing a first contact lens front surface that compensates for the net residual optical aberration and conventional first order prescriptive components;
   e) determining an optical path difference of the first contact lens;
   f) selecting a second contact lens design having a front surface, a back surface and a predetermined optical path difference, wherein at least one of the front and back surfaces comprises a simple geometry;
   g) calculating the difference between the optical path difference of the first contact lens design and the predetermined optical path difference of the second contact lens design;
   h) reshaping only one of the front and back surfaces of the second contact lens design to create a final lens design in an iterative process until the difference between the optical path difference of the first contact lens design and the predetermined optical path difference of the second contact lens design is less than a predetermined tolerance; and
   i) fabricating a contact lens from the final lens design.

2. The method for fabricating a contact lens according to claim 1, wherein the predetermined tolerance is less than a twentieth of a wave.

* * * * *